(12) United States Patent
Son et al.

(10) Patent No.: US 8,949,349 B2
(45) Date of Patent: Feb. 3, 2015

(54) COMMUNICATIONS SYSTEM INCLUDING TRUSTED SERVER TO VERIFY A REDIRECTION REQUEST AND ASSOCIATED METHODS

(75) Inventors: Giyeong Son, Mississauga (CA); Michael John Rogan, Kitchener (CA); Graeme Roger Stuart Whittington, Toronto (CA); Bruno Richard Preiss, Waterloo (CA); David Bajar, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 723 days.

(21) Appl. No.: 13/072,955

(22) Filed: Mar. 28, 2011

(65) Prior Publication Data

US 2012/0254316 A1    Oct. 4, 2012

(51) Int. Cl.
*G06F 15/16*    (2006.01)
*G06F 15/173*    (2006.01)
*G06F 15/78*    (2006.01)

(52) U.S. Cl.
CPC .................. *G06F 15/781* (2013.01)
USPC ............ 709/206; 709/223; 709/232; 709/238

(58) Field of Classification Search
CPC ............. G06Q 10/10; H04L 29/08072; H04L 41/0213
USPC ........................................................ 709/206
See application file for complete search history.

(56) References Cited

U.S. PATENT DOCUMENTS

| 6,813,635 | B1 | 11/2004 | Jorgenson | 709/225 |
| 7,443,796 | B1 | 10/2008 | Albert et al. | 370/235 |
| 7,606,916 | B1 * | 10/2009 | Potter et al. | 709/229 |
| 2003/0026410 | A1 * | 2/2003 | Lumsden | 379/221.01 |
| 2006/0013147 | A1 | 1/2006 | Terpstra et al. | 370/252 |
| 2009/0077383 | A1 | 3/2009 | De Monseignat et al. | 713/175 |
| 2010/0057845 | A1 | 3/2010 | Thomas et al. | 709/203 |
| 2010/0250656 | A1 * | 9/2010 | Kisel et al. | 709/203 |
| 2011/0138052 | A1 * | 6/2011 | Caplan et al. | 709/226 |

FOREIGN PATENT DOCUMENTS

WO    98/58315    12/1998    ................ G06F 9/46

* cited by examiner

*Primary Examiner* — Faruk Hamza
*Assistant Examiner* — Abu-Sayeed Haque
(74) *Attorney, Agent, or Firm* — Allen, Dyer, Doppelt, Milbrath & Gilchrist, P.A.

(57) ABSTRACT

A communications system includes a mobile wireless communications device, a trusted server, and a plurality of host servers. A given one of the host servers is in communication with the mobile wireless communications device. The given host server is configured to generate and send a redirection request to the mobile wireless communications device, the redirection request requesting the mobile wireless communications device to communicate with an other one of the host servers. The mobile wireless communications device is configured to send the redirection request to the trusted server, and the trusted server configured to send the redirection request to the mobile wireless communications device based upon verification of the redirection request.

20 Claims, 7 Drawing Sheets

COMMUNICATIONS SYSTEM INCLUDING TRUSTED SERVER TO VERIFY A REDIRECTION REQUEST AND ASSOCIATED METHODS

TECHNICAL FIELD

The present disclosure relates to the field of communications, and, in particular, to communications systems.

BACKGROUND

Mobile wireless communications devices have become pervasive in today's society. Many individuals own such mobile wireless communications devices and use them on a daily basis, both for placing voice calls and for performing other tasks. For example, some mobile wireless communications devices may now provide connectivity with the Internet, and may allow access to e-mail accounts, instant messaging accounts, and social networking sites.

Service providers, such as host servers, together with intermediary networks, including intermediate servers, provide for the connectivity between these mobile wireless communications devices and other mobile wireless communications devices, as well as the internet. In addition, these host servers may provide for connectivity between the mobile wireless communications devices and e-mail servers. Due to the popularity of such mobile wireless communications devices, the host servers and the intermediate servers are often congested with traffic.

This congestion can cause degradation in the quality of service delivered to the mobile wireless communications devices (i.e. poor voice connections, dropped calls, slow data connections). In addition, due to congestion or network failures, it may be desirable for a mobile wireless communications device to disconnect from a service provider or host server, and connect to a new service provider or host server.

Consequently, it is desirable for the communications system as a whole to provide quick, efficient communications between the service providers or host servers and the mobile wireless communications devices, together with ways for the mobile wireless communications devices to disconnect from one service provider or host server and to connect to another service provider or host server. Therefore, new communications systems are still needed.

DETAILED DESCRIPTION

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to denote similar elements in alternative embodiments.

Generally speaking, a communications system may include a mobile wireless communications device, a trusted server, and a plurality of host servers. A given one of the host servers may be in communication with the mobile wireless communications device and may be configured to generate and send a redirection request for the mobile wireless communications device. The redirection request may request the mobile wireless communications device to communicate with an other one of the host servers. Further, the trusted server may be configured to receive the redirection request and send the redirection request to the mobile wireless communications device based upon verification of the redirection request. This advantageously increases security in the communications system, as the mobile wireless communications device does not connect to the other host server until that host server has been verified by the trusted server.

In some applications, the given one of said host servers may be configured to send the redirection request for said mobile wireless communications device to said mobile wireless communications device, and said mobile wireless communications device may be configured to send the redirection request to said trusted server.

In other applications, the communications system may include an intermediate server, and the given one of the host servers may be in communication with the mobile wireless communications device via the intermediate server. In addition, the given one of the host servers may be configured to generate and send the redirection request for the mobile wireless communications device to the intermediate server, and the redirection request may request the mobile wireless communications device to communicate with the other one of the host servers via the intermediate server. The intermediate server is configured to send the redirection request to the trusted server.

In some applications, the trusted server may verify the redirection request by querying the other host server for a host address associated therewith. Also, the trusted server may send the host address to the mobile wireless communications device.

The mobile wireless communications device may also be configured to connect to the other host server based upon the host address. The given host server may be configured to process at least one job request received from the mobile wireless communications device. The at least one job request may be an e-mail processing request or an Internet connectivity request, for example.

The other host server may be configured to process at least one job request received from the mobile wireless communications device. The at least one job request may be an e-mail processing request or an Internet connectivity request.

A method aspect is directed to a method of operating a communications system comprising a mobile wireless communications device, an intermediate server, a trusted server, and a plurality of host servers, a given one of the host servers in communication with the mobile wireless communications device via the intermediate server. The method may include generating and sending, using the given host server, a redirection request for the mobile wireless communications device to the intermediate server, the redirection request requesting the mobile wireless communications device to communicate with an other one of the host servers via the intermediate server. The method may also include sending, using the intermediate server, the redirection request to the trusted server. The method may further include sending, using the trusted server, the redirection request to the mobile wireless communications device based upon verification of the redirection request.

Figure 1:
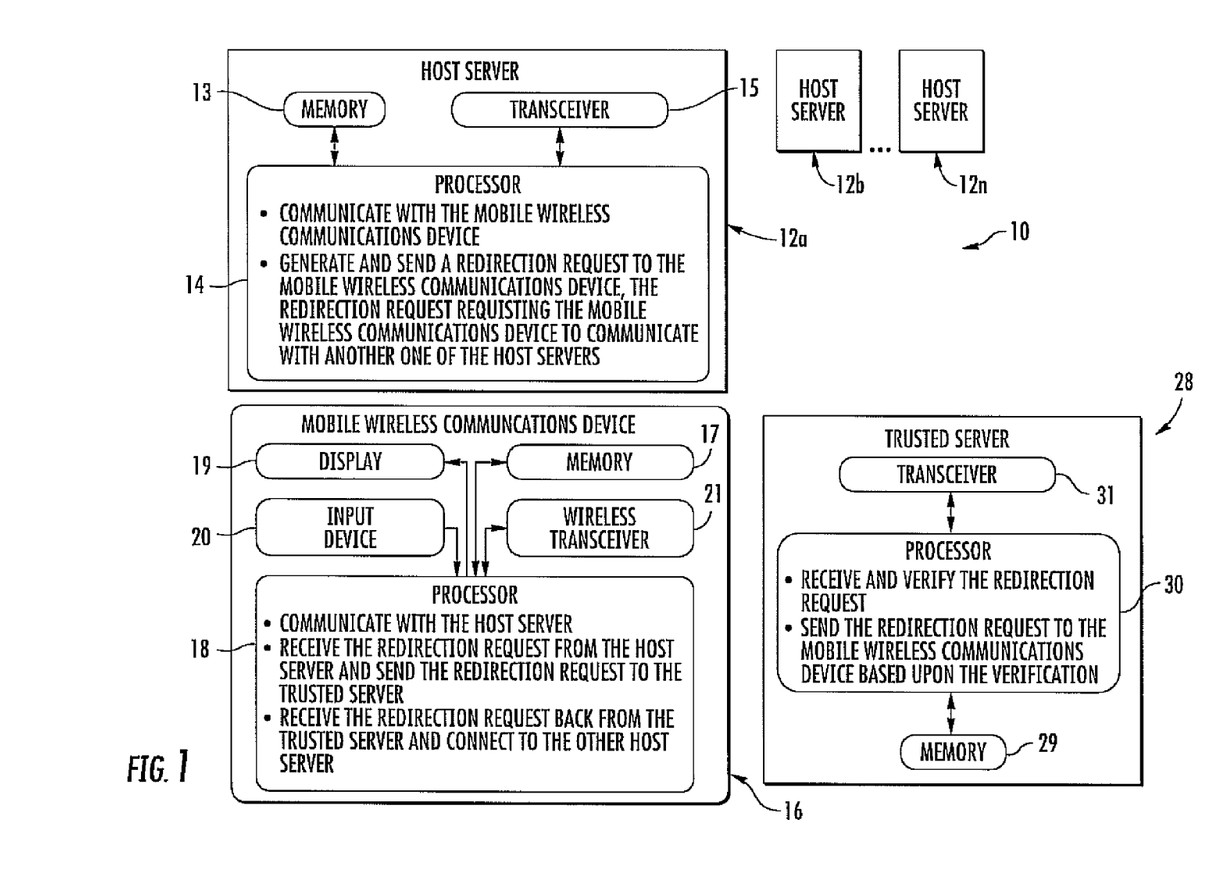
FIG. 1 is a schematic block diagram of a communications system in accordance with the present disclosure.

With reference to FIG. 1, a communications system 10 is now described. The communications system 10 includes a plurality of host servers 12a . . . 12n, a mobile wireless communications device 16, and a trusted server 28. A given host server 12a illustratively includes a memory 13 and a transceiver 15, both coupled to a processor 14. It should be understood that the other host servers 12b . . . 12n may contain similar components, and therefore need no further description herein.

The processor 14 of the host server 12a is configured to communicate with the mobile wireless communications device 16. As shown in the more detailed embodiment of FIG. 2, the processor 14' of the host server 12a' may be configured to process at least one job request received from the mobile wireless communications device 16'. This job request may be an e-mail processor request or an Internet connectivity request, for example.

Referring again to FIG. 1, the processor 14 is also configured to generate and send a redirection request for the mobile wireless communications device 16 to the mobile wireless communications device 16.

The redirection request requests the mobile wireless communications device to communicate with an other one of the host servers 12b . . . 12n. In other words, the redirection request requests the mobile wireless communications device to cease communications with the host server 12a and to instead communicate with an other host server of the host servers 12b . . . 12n. This may be done to help balance the load on the host servers 12a . . . 12n of the communications system 10, for example.

The trusted server 28 includes a memory 29 and a transceiver 31 coupled to a processor 30. The processor 30 of the trusted server 28 receives the redirection request from the mobile wireless communications device 16. The processor 30 then verifies the redirection request, and sends the redirection request back to the mobile wireless communications device 16 based upon that verification. This advantageously increases the security in the communications system 10, as the trusted server 28 verifies the other server before mobile wireless communications device 16 connects thereto. Verification is useful because, in some situations, a malicious host can send a redirection request on behalf of the host server 12a to the mobile wireless communications device 16. Without the trusted server 28 to verify such a redirection request, the mobile wireless communications device 16 could redirect to this malicious host and therefore be compromised.

Verification of the redirection request can also increase the quality of service delivered to the mobile wireless communications device 16. If the host server that the redirection request requests the mobile wireless communications device 16 is not experiencing technical difficulties, the trusted server 28 may not verify that host server, and thus the mobile wireless communications device may be saved from attempting to connect to that host server, when connecting to that host server might have caused poor quality of service to be delivered to the mobile wireless communications device.

Figure 2:
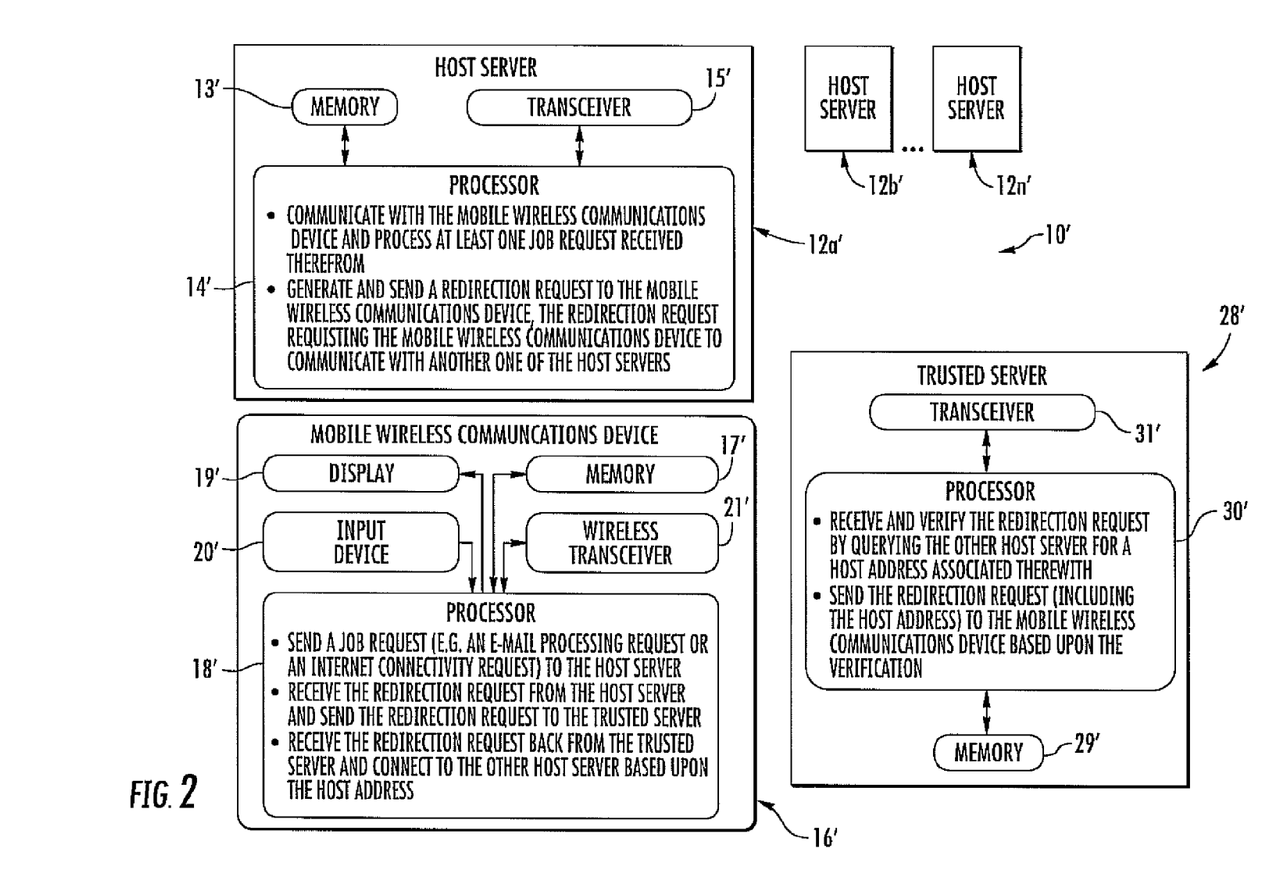
FIG. 2 is a schematic block diagram of a more detailed embodiment of a communications system in accordance with the present disclosure.

As shown in the more detailed embodiment of FIG. 2, the processor 30' of the trusted server 28' may verify the redirection request by querying the other host server for a host address associated therewith. The processor 30' may then compare the host address to a list of known safe host addresses, for example, or may perform other verification operations on the host address. When sending the redirection request to the mobile wireless communications device 16', the processor 30' may include the host address.

Referring once again to FIG. 1, the mobile wireless communications device 16 includes a memory 17, a display 19, an input device 20, and a wireless transceiver 21 all coupled to a processor 18. The memory 13 may include both volatile and non-volatile portions, for example. The input device 20 may be a keyboard, a touchpad, a trackball, or a combination thereof. In addition, it should be understood that the display 19 may be a touch sensitive display and may function as the input device 20, in some applications.

As explained above, the processor 18 of the mobile wireless communications device 16 communicates with the host server 12a. The processor 18 receives the redirection request from the trusted server 28 and connects to an other host server 12b . . . 12n.

As shown in the more detailed embodiment of FIG. 2, the processor 18' of the mobile wireless communications device 16' may send the job request to the host server 12a'. As explained above, this job request may be an e-mail processing request or an Internet connectivity request. This job request may also be another type of job request, such as a voice call request. In addition, the processor 18' may send the job request based upon input received via the input device 20', or automatically based upon an operating condition of the mobile wireless communications device 16'. It should be further appreciated that, after redirection, the processor 18' of the mobile wireless communications device 16' may send a job request to the host server to which it was redirected. This host server may then process the job.

Referring briefly again to FIG. 1, those skilled in the art will appreciate that the memories 13, 24, 29 may include both volatile and non-volatile portions. In addition, the transceivers 15, 26, 28 may be wired transceivers, wireless transceivers, or both.

Figure 3:
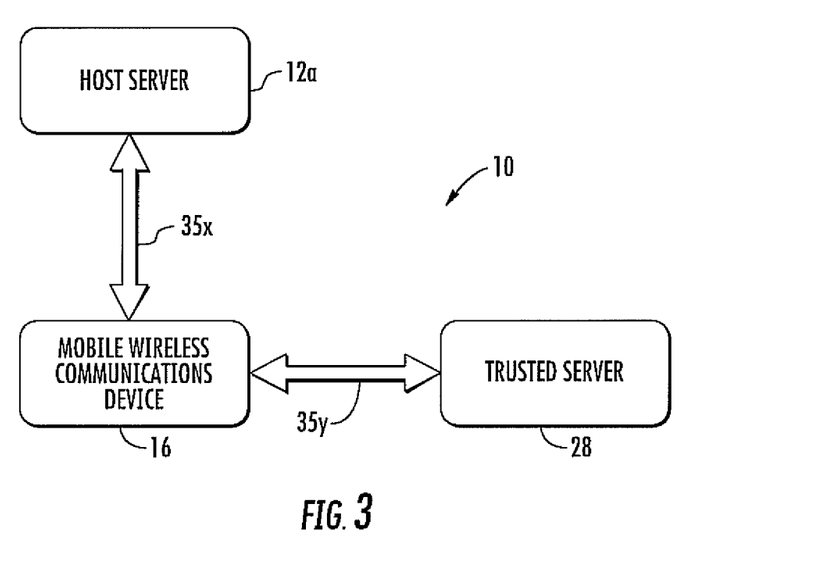
FIG. 3 is a block diagram showing routing of the redirect request in the communications system of FIG. 1 or FIG. 2.

The routing of the redirection request is perhaps shown best in FIG. 3. As illustrated, the host server 12a generates and sends the redirection request to the mobile wireless communications device 16 via a first communications path 35x. The mobile wireless communications device 16 then sends the redirection request to the trusted server 28 via a second communications path 35y. The trusted server 28, after verifying the redirection request, sends it back to the mobile wireless communications device 16.

Figure 4:
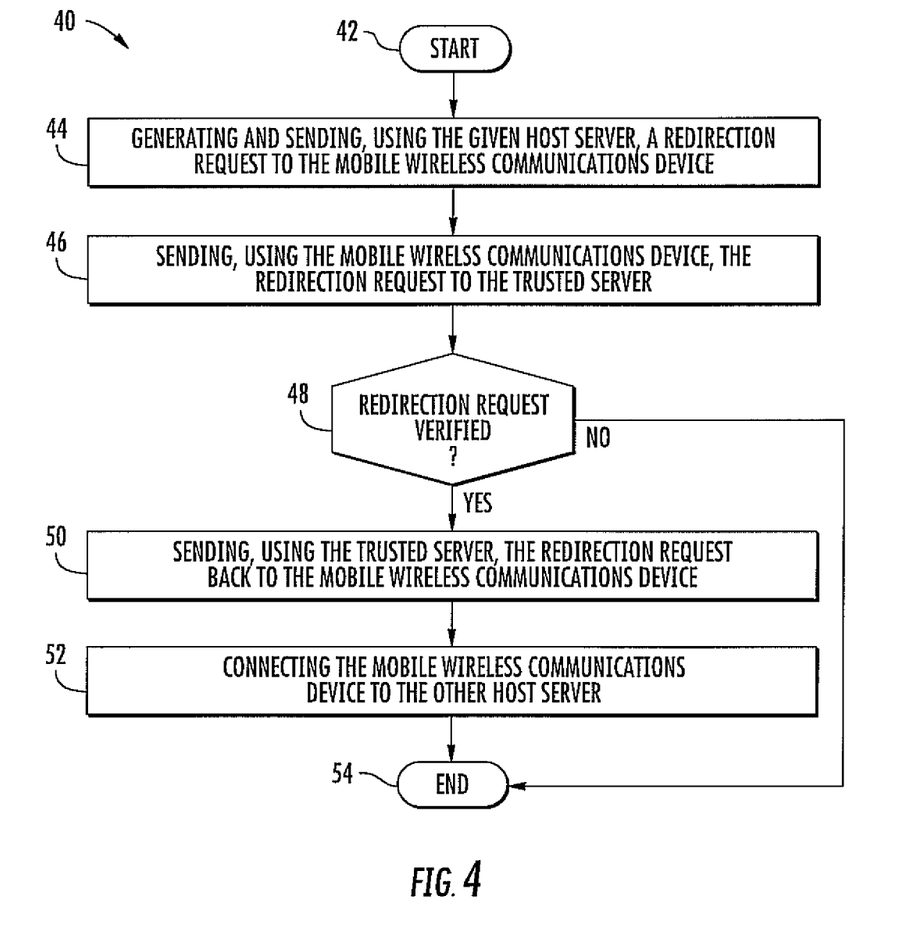
FIG. 4 is a flowchart of a method of operating a communications system in accordance with the present disclosure.

With reference to the flowchart 40 of FIG. 4, a method of operating the communications system of FIG. 1 is now described. After the start (Block 42), the host server 12a generates and sends a redirection request to the mobile wireless communications device 16 (Block 44). Next, the mobile wireless communications device 16 sends the redirection request to the trusted server 28 (Block 46).

At Block 48, the trusted server 28 verifies the redirection request, and, if it is verified, sends it back to the mobile wireless communications device 16 at Block 50. The mobile wireless communications device 16 then connects to one of the other host servers 12b . . . 12n. Block 54 indicates the end of the method. It should be noted that if the redirection request is not verified at Block 48, the method thereafter ends (Block 54).

Figure 5:
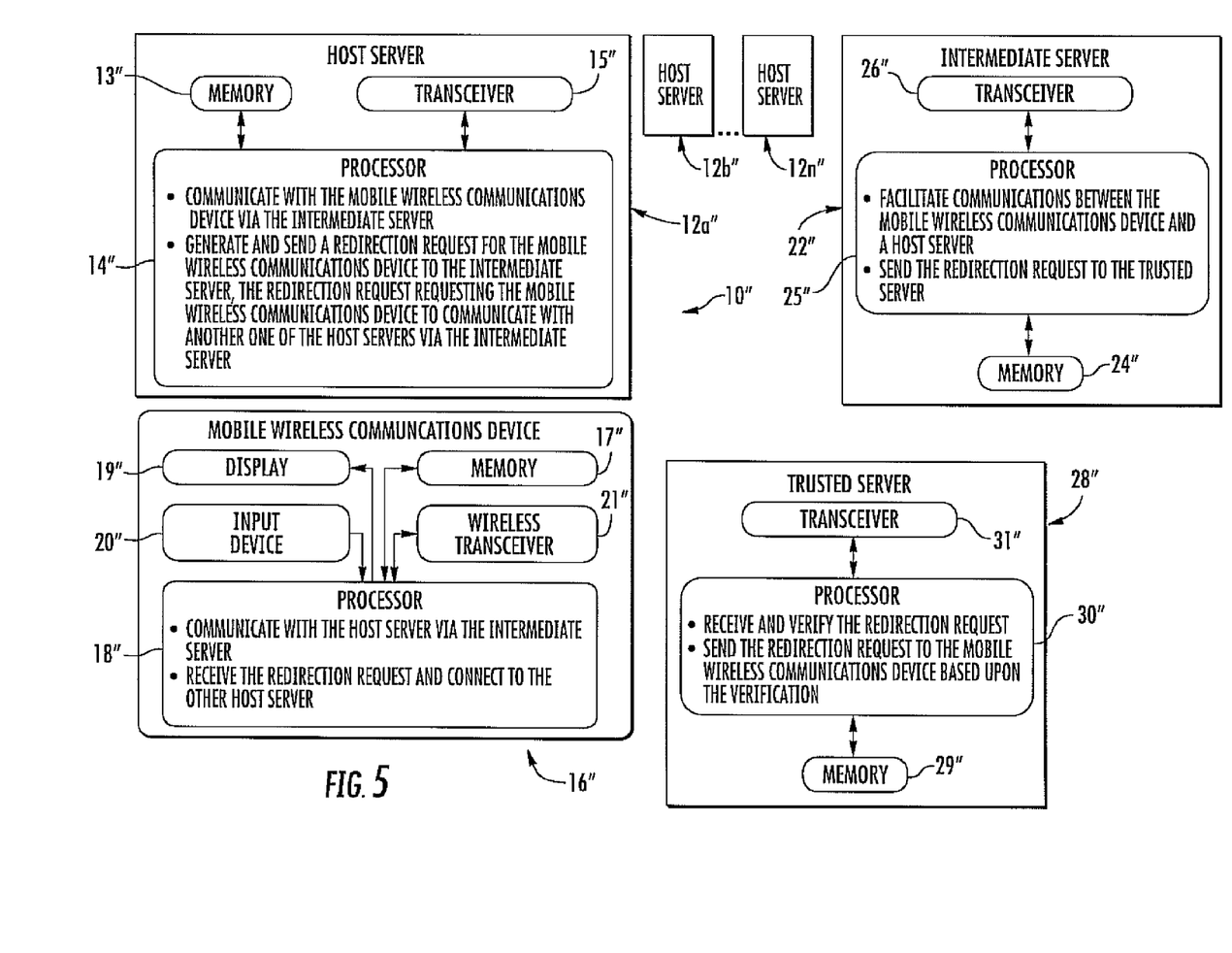
FIG. 5 is a schematic block diagram of another embodiment of a communications system in accordance with the present disclosure.

It should be appreciated that some embodiments of the communications system 10" may include an intermediate server 22", as shown in FIG. 5. Here, the processor 14" of the host server 12a" is configured to communicate with the mobile wireless communications device 16" via the intermediate server 22". That is, the intermediate server 22" provides a communications path between the host server 12a" and the mobile wireless communications device 16". The processor 14" is also configured to generate and send a redirection request for the mobile wireless communications device 16" to the intermediate server 22". The redirection request requests the mobile wireless communications device to communicate with an other one of the host servers 12b" . . . 12n" via the intermediate server 22".

The intermediate server 22" includes a memory 24" and a transceiver 26" coupled to a processor 25". The processor 25" of the intermediate server 22" is configured to facilitate communications between the mobile wireless communications device 16", as explained above, and the host server 12a" The processor 25" receives the redirection request from the host server 12a", and sends the redirection request to the trusted server 28".

In addition, it should be understood that in this embodiment the processor 30" of the trusted server 28" receives the redirection request from the intermediate server 22".

Figure 6:
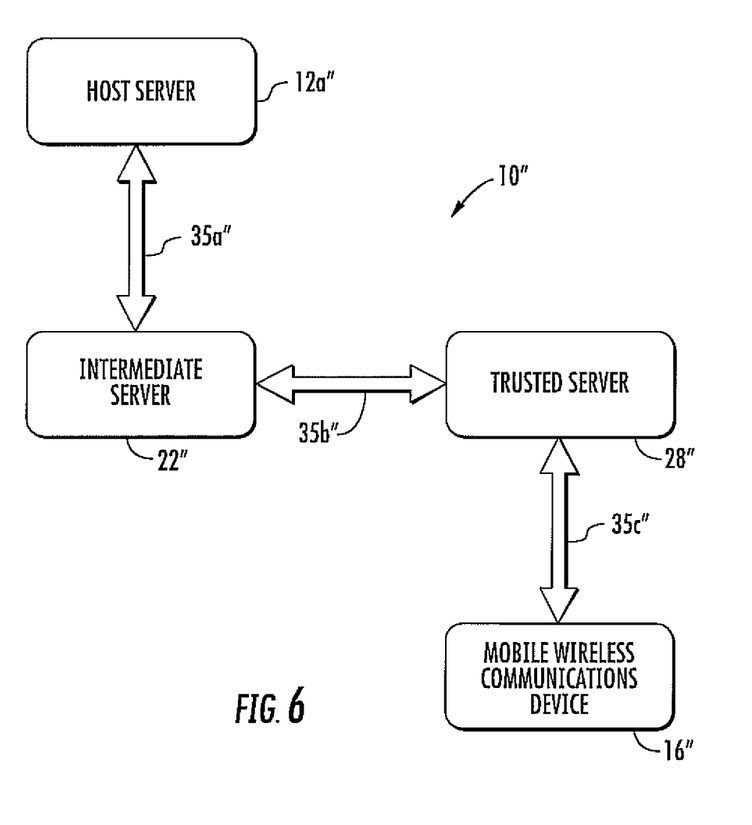
FIG. 6 is a block diagram showing routing of the redirect request in the communications system of FIG. 5.

The routing of the redirection request in this embodiment is perhaps shown best in FIG. 6. As illustrated, the host server 12a" generates and sends the redirection request to the intermediate server 22" via a first communications path 35a". The intermediate server 22" then sends the redirection request to the trusted server 28" via a second communications path 35b". The trusted server 28", after verifying the redirection request, sends it to the mobile wireless communications device 16" via a third communications path 35c".

Example components of a mobile wireless communications device 1000 that may be used in accordance with the above-described embodiments are further described below with reference to FIG. 7. The mobile wireless communications device 1000 may function as either the electronic device described above, or the personal information token as described above. The device 1000 illustratively includes a housing 1200, a keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400. Alternatively or additionally, the keypad 1400 may be a "soft" keypad implemented, for example, by providing images of keys on the display 1600.

The housing 1200 may be elongated vertically, or may take on other sizes and shapes (including clamshell housing structures). The keypad may include a mode selection key, or other hardware or software for switching between text entry and telephony entry.

Figure 7:
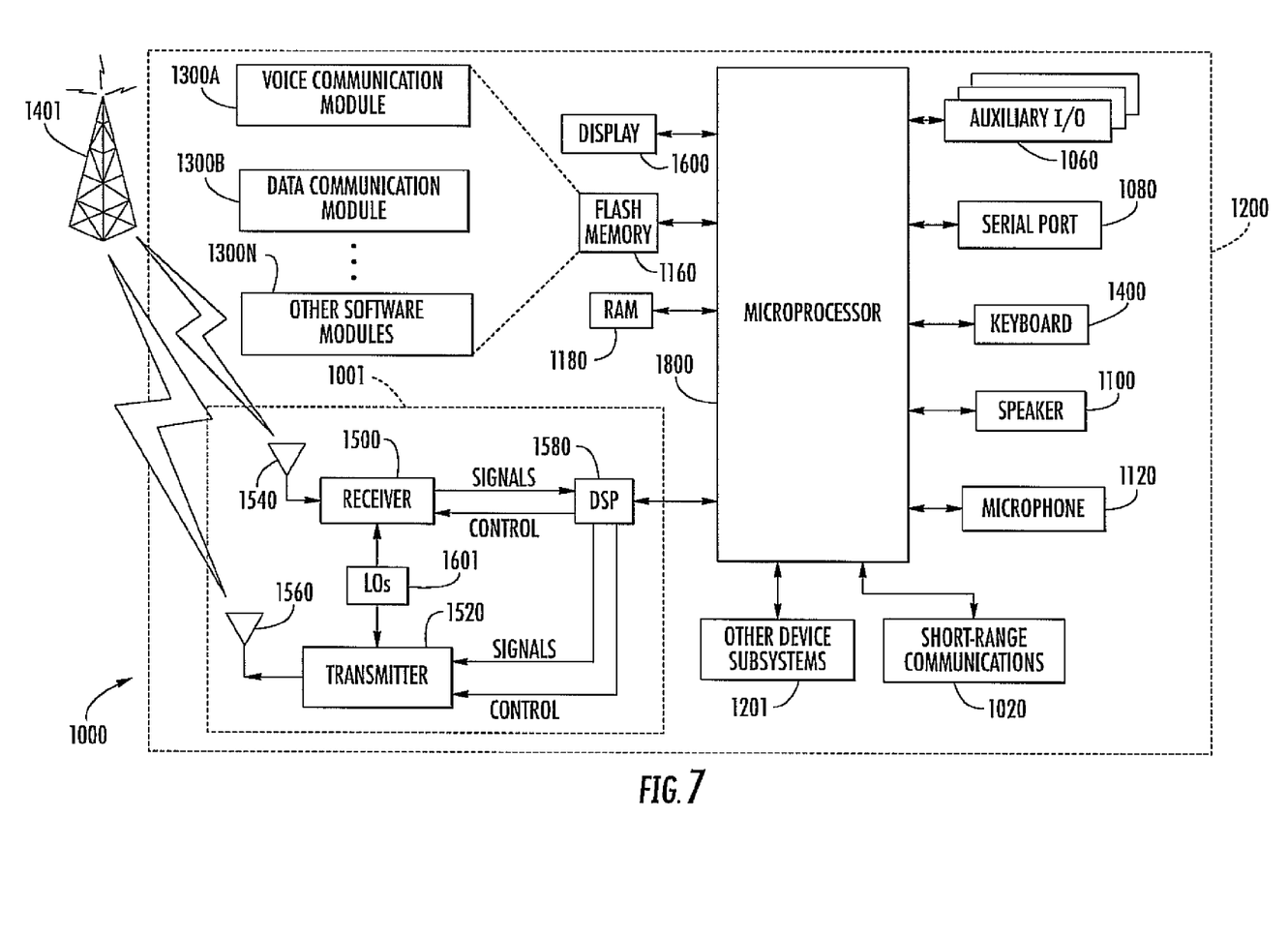
FIG. 7 is a schematic block diagram illustrating example components which may be used in the communications systems of FIG. 1, FIG. 2, and FIG. 5 in accordance with an example embodiment.

In addition to the processing device 1800, other parts of the mobile device 1000 are shown schematically in FIG. 7. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as voice and data communications 1300A and 1300B, may be installed on the device 1000 during manufacture. In addition, a personal information manager (PIM) application may be installed during manufacture (not shown). The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary input/output (I/O) device 1060. A device may also be used to compose data items, such as e-mail messages, using the keypad 1400 and/or some other auxiliary I/O device 1060, such as a trackball, a touchpad, a rocker switch, a thumb-wheel, touch sensitive display or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A communications system comprising:
    a mobile wireless communications device;
    a trusted server; and
    a plurality of host servers, a given one of said host servers in communication with said mobile wireless communications device and configured to generate and send a redirection request for said mobile wireless communications device, the redirection request requesting the mobile wireless communications device to communicate with an other one of said host servers;
    said trusted server configured to receive the redirection request and to send the redirection request to said mobile wireless communications device based upon verification of the redirection request.

2. The communications system of claim 1 wherein the given one of said host servers is configured to send the redirection request for said mobile wireless communications device to said mobile wireless communications device; and wherein said mobile wireless communications device is configured to send the redirection request to said trusted server.

3. The communications system of claim 1 further comprising an intermediate server; wherein the given one of said host servers is in communication with said mobile wireless communications device via said intermediate server; wherein the given one of said host servers is configured to generate and send the redirection request for said mobile wireless communications device to said intermediate server; wherein the redirection request requests said mobile wireless communications device to communicate with the other one of said host servers via said intermediate server; and wherein said intermediate server is configured to send the redirection request to said trusted server.

4. The communications system of claim 1 wherein said trusted server verifies the redirection request by querying said other host server for a host address associated therewith.

5. The communications system of claim 4 wherein said trusted server sends the host address to said mobile wireless communications device.

6. The communications system of claim 5 wherein said mobile wireless communications device is also configured to connect to said other host server based upon the host address.

7. The communications system of claim 1 wherein said given host server is configured to process at least one job request received from said mobile wireless communications device.

8. The communications system of claim 7 wherein the at least one job request comprises an e-mail processing request.

9. The communications system of claim 7 wherein the at least one job request comprises an Internet connectivity request.

10. The communications system of claim 1 wherein said other host server is configured to process at least one job request received from said mobile wireless communications device.

11. The communications system of claim 10 wherein the at least one job request comprises an e-mail processing request.

12. The communications system of claim 10 wherein the at least one job request comprises an Internet connectivity request.

13. A communications system comprising:
    a mobile wireless communications device;
    a trusted server; and
    a plurality of host servers, a given one of said host servers in communication with said mobile wireless communications device and configured to process at least one job request received from said mobile wireless communications device;
    said given host server also configured to generate and send a redirection request to said mobile wireless communications device, the redirection request requesting the mobile wireless communications device to communicate with an other one of said host servers;
    said mobile wireless communications device configured to send the redirection request to said trusted server;
    said trusted server configured to verify the redirection request by querying said other host server for a host address associated therewith, and to send the redirection request back to said mobile wireless communications device based upon the verification.

14. The communications system of claim 13 wherein said trusted server sends the host address to said mobile wireless communications device.

15. The communications system of claim 14 wherein said mobile wireless communications device is also configured to connect to said other host server based upon the host address.

16. A method of operating a communications system comprising a mobile wireless communications device, a trusted server, and a plurality of host servers, a given one of the host servers in communication with the mobile wireless communications device, the method comprising:
   generating and sending, using the given host server, a redirection request to the mobile wireless communications device, the redirection request requesting the mobile wireless communications device to communicate with an other one of the host servers via;
   sending, using the mobile wireless communications device, the redirection request to the trusted server; and
   sending, using the trusted server, the redirection request to the mobile wireless communications device based upon verification of the redirection request.

17. The method of claim 16 wherein the trusted server verifies the redirection request by querying the other host server for a host address associated therewith.

18. The method of claim 17 wherein the trusted server sends the host address to the mobile wireless communications device.

19. The method of claim 18 wherein the mobile wireless communications device connects to the other host server based upon the host address.

20. The method of claim 16 further comprising processing, using the given host server, at least one job request received from the mobile wireless communications device.

* * * * *